United States Patent
Luschi et al.

(10) Patent No.: US 9,729,224 B2
(45) Date of Patent: Aug. 8, 2017

(54) WIRELESS RECEIVER WITH RECEIVE DIVERSITY

(75) Inventors: Carlo Luschi, Oxford (GB); Simon Huckett, Bristol (GB); Steve Allpress, Bristol (GB); Philip Jones, Swindon (GB)

(73) Assignee: Icera, Inc., Wilmington, DE (US)

( * ) Notice: Subject to any disclaimer, the term of this patent is extended or adjusted under 35 U.S.C. 154(b) by 1057 days.

(21) Appl. No.: 12/016,688

(22) Filed: Jan. 18, 2008

(65) Prior Publication Data

US 2009/0111542 A1 Apr. 30, 2009

(51) Int. Cl.
*H04B 7/04* (2017.01)
*H04B 7/08* (2006.01)
*H04B 7/02* (2017.01)

(52) U.S. Cl.
CPC ............ *H04B 7/0874* (2013.01); *H04B 7/02* (2013.01); *H04B 7/04* (2013.01)

(58) Field of Classification Search
CPC .. H03G 3/3068; H03G 3/3078; H04B 7/0874; H04B 7/04; H04B 7/0413; H04B 7/0456; H04B 7/08; H04B 7/0802; H04B 7/0817; H04B 7/082; H04B 7/0868; H04B 7/0871; H04B 7/02
USPC ....... 455/8, 137, 278.1, 233.1, 234.1, 232.1, 455/234.2, 272, 273, 277.1, 277.2, 279.1, 455/132, 133, 134, 135, 138; 370/267, 370/347, 16, 17
See application file for complete search history.

(56) References Cited

U.S. PATENT DOCUMENTS 5,557,603 A * 9/1996 Barlett et al. ................. 370/228
6,804,312 B1 10/2004 Win et al.
(Continued)

FOREIGN PATENT DOCUMENTS

CN 1812288 A 8/2006
EP 1587338 10/2005
(Continued)

OTHER PUBLICATIONS

International Search Report for related PCT Application No. PCT/EP2008/064474, 4 PP.
(Continued)

*Primary Examiner* — Wesley Kim
*Assistant Examiner* — Philip Sobutka

(57) ABSTRACT

Wireless receivers are described for receiving signals from a transmitter. A receiver can include a plurality of antennas each for receiving a version of a signal via a different propagation channel and providing that version to a respective input. Signal processing means can be included and configured to operate diversity processing of a supplied number of said inputs for use in performing detection of said signal. The receiver can include channel parameter estimation means, configured to estimate one or more channel parameters on the propagation channels. The receiver can also include selection means configured to select only a subset of said inputs to implement a specific dimensionality of the receiver diversity processing, in dependence on the one or more channel parameters indicative of channel conditions on said propagation channels. The diversity processing can be linear or non-linear. Related methods and software implementations and computer program products are also described.

20 Claims, 3 Drawing Sheets

(56) References Cited

U.S. PATENT DOCUMENTS

| | | | |
|---|---|---|---|
| 6,907,272 B2 | 6/2005 | Roy | |
| 7,146,134 B2* | 12/2006 | Moon et al. | 455/67.11 |
| 7,245,893 B1* | 7/2007 | Husted et al. | 455/226.3 |
| 7,486,931 B2 | 2/2009 | Cho et al. | |
| 2003/0043929 A1* | 3/2003 | Sampath | H04B 7/0417 375/267 |
| 2005/0163270 A1 | 7/2005 | Akita et al. | |

FOREIGN PATENT DOCUMENTS

| | | |
|---|---|---|
| EP | 1830487 | 5/2007 |
| EP | 1843485 | 10/2007 |
| JP | 2005-535171 | 11/2005 |
| JP | 2007142922 A | 6/2007 |
| WO | 2004012359 A2 | 2/2004 |
| WO | 2007049547 A1 | 5/2007 |

OTHER PUBLICATIONS

Written Opinion for related PCT Application No. PCT/EP2008/064474, 7 PP.

Clark, Martin, et al., V., *Optimum Linear Diversity Receivers for Mobile Communications*, IEEE Transactions on Vehicular Technology, vol. 43, No. 1, pp. 47-56, Feb. 1994.

Heikkila, et al., *Increasing HSDPA Throughput By Employing Space-Time Equalization*, IEEE International Symposium on Personal, Indoor and Mobile Radio Communications, vol. 4, pp. 2328-2332, Sep. 2004.

Love, Robert, et al., *MMSE Equalization for UMTS HSDPA*, IEEE Vehicular Technology conference, vol. 4, pp. 2416-2420, Oct. 2003.

Winters, J.H., *The Impact of Antenna Diversity on the Capacity of Wireless Communication Systems*, IEEE Transactions on Communications, vol. 42, No. 2/3/4, pp. 1740-1751, Feb. 1994.

Balaban, Philip, et al, *Optimum Diversity Combining and Equalization in Digital Data Transmission with Applications to Cellular Mobile Radio—Part I. Theoretical Considerations*, IEEE Transactions on Communications, vol. 40, No. 5, pp. 885-894, May 1992.

Translation of Japanese Office Action dated Feb. 5, 2013, Application No. 2010-531502, 4 pages.

Foreign Communication From A Related Counterpart Application, Japanese Application 2010-531502, Japanese Office Action dated Jan. 25, 2013, 3 pages.

\* cited by examiner

WIRELESS RECEIVER WITH RECEIVE DIVERSITY

RELATED APPLICATIONS

This application claims priority to GB Application No.: 0721428.1, filed 31 Oct. 2007, the contents of which are incorporated herein by reference in its entirety.

FIELD OF THE INVENTION

The present invention relates to receive diversity in a wireless receiver.

BACKGROUND OF THE INVENTION

In a wireless communication system, communication is effected by a transmitter transmitting a radio frequency (RF) signal, which is to be picked up by a receiver.

Figure 1:
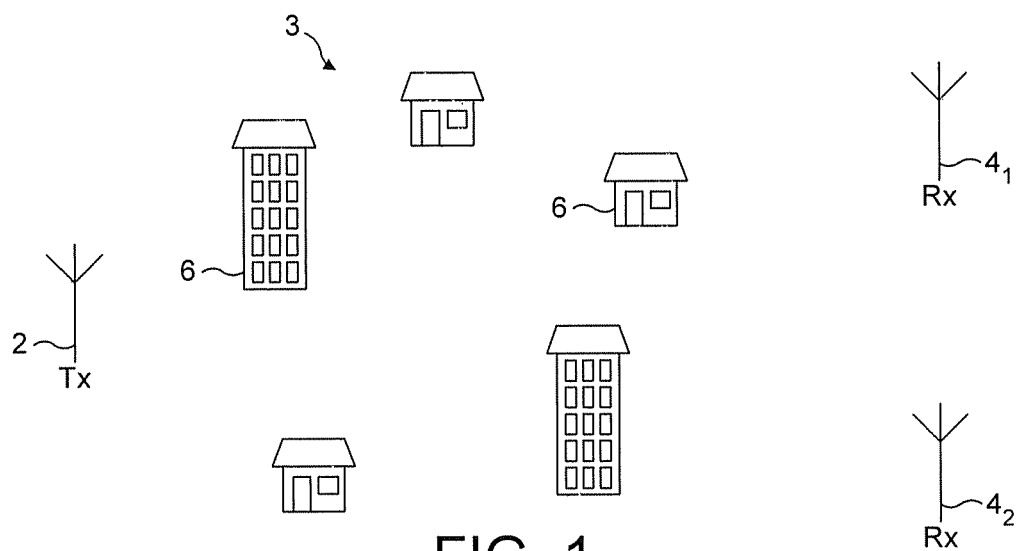

Multi-path fading occurs where the signal travels from the transmitter to the receiver over multiple propagation paths resulting in the reception of multiple replicas of the same signal which interfere with one another. FIG. 1 is a (highly schematised) illustration of the effects of multi-path fading. Here, a transmit antenna 2 broadcasts a signal over an area 3 including a number of buildings 6 or other obstacles which obstruct and/or reflect the signal. The result is that, at any given point, the received signal will be a superposition of multiple replicas of the signal received via multiple propagation paths. Over a range of positions, the received signal intensity thus displays a pattern of peaks and troughs caused by constructive and destructive interference of the different propagation paths.

Note that FIG. 1 is not to scale. In fast-fading conditions, the signal intensity can change measurably due to fading effects over a matter of meters or even centimeters depending on the obstacles and the wavelength of the signal. This means that there may be noticeable fluctuations in signal quality as the receivers move about. In the case where the receiver is a user equipment (UE) terminal such as a mobile phone or laptop, the user will experience a noticeable difference in the signal quality. When comparing the signals at the two receive antennas what matters is not only the signal intensity, but the amplitude and phase (and statistical distribution) of the complex tap-weights that constitute the channel response.

Spatial receive diversity is a technique whereby a receiver is provided with a plurality of physically separated antennas, e.g. the antennas $4_1$ and $4_2$ as shown in FIG. 1. Each receive antenna corresponds to a respective propagation channel, which in this context results from the multiple propagation paths as experienced at a given receive antenna from the transmit antenna 2. Note again that FIG. 1 is not to scale: the two receive antennas $4_1$ and $4_2$ are typically housed within the same terminal, for example within the same mobile terminal.

Space diversity reception is a well known means for improving the performance of a wireless communication system, as described e.g. in J. G. Proakis, "Digital Communications", New York: McGraw-Hill, 1995, P. Balaban and J. Salz, "Optimum Diversity Combining and Equalization in Digital Data Transmission with Application to Cellular Mobile Radio—Part I: Theoretical Considerations", IEEE Transactions on Communications, vol. 40, no. 5, pp. 885-894, May 1992, and J. H. Winters, J. Salz, and R. D. Gitlin, "The Impact of Antenna Diversity on the Capacity of Wireless Communication Systems", IEEE Transactions on Communications, vol. 42, no. 2/3/4, pp. 1740-1751, February 1994. The presence of multiple receive antennas provides the receiver with multiple replicas of the desired signal, transmitted over distinct propagation channels. For sufficient spatial separation between the receive antennas (relative to the carrier wavelength of the radio transmission), the received signals at the different antennas are characterized by uncorrelated channels (i.e., have channel impulse responses with independently fading tap-weights). This system realizes a diversity gain, which can be exploited to improve the error performance of the receiver.

The diversity gain and the corresponding performance advantage decrease for an increased correlation between the diversity channels. However, even in the presence of correlated channels, antenna diversity can still provide a performance advantage in terms of a power gain, which is maximum when the signals on the different diversity branches are affected by uncorrelated disturbance (sum of noise and interference). For instance, a dual-antenna receiver with perfectly correlated diversity channels and uncorrelated noise on the two diversity signals provides a 3 dB gain in terms of signal-to-noise power ratio (SNR). Again, this gain decreases for an increased correlation of the disturbance on the different diversity branches.

The use of multiple receive antennas has been considered for wireless cellular systems like 3GPP Wideband Code Division Multiple-Access (WCDMA) and High-Speed Downlink Packet Access (HSDPA). Examples are given in R. Love, K. Stewart, R. Bachu, and A. Ghosh, "MMSE Equalization for UMTS HSDPA", IEEE Vehicular Technology Conference, vol. 4, Orlando, Fla., October 2003, pp. 2416-2420, and M. J. Heikkila and K. Majonen, "Increasing HSDPA Throughput by Employing Space-Time Equalization", IEEE International Symposium on Personal, Indoor and Mobile Radio Communications, vol. 4, Barcelona, Spain, September 2004, pp. 2328-2332.

Although space diversity provides an improvement of the error performance of the receiver, the increased "dimensionality" of the receiver also incurs an increased computational cost. Particularly in the case of a mobile terminal receiver for example, it is important to consider that the performance advantage provided by receive diversity comes at the cost of additional complexity and power consumption, deriving not only from the requirement of multiple antenna units and RF chains, but also from the increased dimensionality of the receiver processing functions required to perform signal detection.

It would be advantageous to benefit from the improved performance of receive diversity whilst avoiding some of the computational cost.

SUMMARY

According to one aspect of the invention, there is provided a wireless receiver for receiving a signal transmitted by a transmitter, the receiver comprising:

a plurality of antennas each for receiving a version of the signal via a different propagation channel and providing that version at a respective input;

signal processing means configured to operate diversity processing of a supplied number of said inputs for use in performing detection of said signal;

channel parameter estimation means configured to estimate one or more channel parameters on the propagation channels; and selection means configured to select only a subset of said inputs to implement a specific dimensionality of the receiver diversity processing, in dependence on the one or more channel parameters indicative of channel conditions on said propagation channels.

The diversity processing can be linear or non-linear.

Thus the invention provides a receiver structure capable of selecting the use of the signals received on all or on a subset of the receive diversity branches, based on the estimation of specific channel parameters in order to achieve the best trade-off between receiver performance and the associated computational cost and power consumption. It will be appreciated that the principles of the invention extend to other types of diversity processing, e.g. polarisation diversity.

According to another aspect of the invention there is provided a method of processing a signal transmitted via a wireless network, the method comprising:

receiving at each of a plurality of antennas a version of the signal via a different propagation channel and providing that version at a respective input;

operating diversity processing of a supplied number of inputs for use in performing detection of said signal;

estimating one or more channel parameters on the propagation channels; and selecting only a subset of said inputs to implement a specific dimensionality of the receiver diversity processing in dependence on the one or more channel parameters indicative of channel conditions on said propagation channels.

Another aspect of the invention provides a computer program product comprising:

program code means configured to operate diversity processing of a supplied number of inputs for use in performing detection of said signal received as versions at said inputs;

program code means for estimating one or more channel parameters on propagation channels over which said versions have been transmitted; and program code means for selecting only a subset of inputs of said inputs to implement a specific dimensionality of the receiver diversity processing, in dependence on the one or more channel parameters indicative of channel conditions on said propagation channels A further aspect of the invention provides a method of receiving a signal in a wireless communication system comprising:

receiving different versions of the signal via a plurality of different propagation channels and producing a plurality of respective inputs;

using a supplied number of said inputs for diversity processing to perform detection of said signal; estimating one or more channel parameters indicative of channel conditions on said propagation channels; and selectively preventing one or more of said inputs from being supplied for said step of diversity processing in dependence on said one or more channel parameters.

Another aspect of the invention provides a mobile terminal having a wireless receiver comprising a plurality of antennas each for receiving a version of the signal via different propagation channels and providing that version at a respective inputs;

signal processing means configured to operate diversity processing of a supplied number of said inputs for detection of said signal;

channel parameter estimation means configured to estimate one or more channel parameters on the propagation channels; and selection means configured to select only a subset of said inputs to implement a specific dimensionality of the receive diversity processing, in dependence on the one or more channel parameters indicative of channel conditions on said propagation channels.

The channel parameter estimation means is preferably configured to estimate a signal to disturbance ratio of each of said channels. This can then be used to determine whether or not the decision to select the subset of inputs is based on a correlation between a pair of diversity channels, or on a disturbance correlation between a pair of diversity branches. The signal-to-disturbance ratio can be compared to a threshold. If it is greater than a first threshold, the subset of inputs can be selected based on a correlation between at least one pair of diversity channels. If the SDR ratio is less than a second threshold, the subset of inputs can be selected based on a disturbance correlation between a pair of diversity branches.

The first and second thresholds may be the same or different.

Alternatively the selection means can be configured to calculate a result as a function of said channel parameters and to select said subset of inputs in dependence on a comparison of said result to a threshold. The channel parameters in this context can be a signal-to-disturbance ratio of each of said channels, a correlation between at least one pair of diversity channels and a disturbance correlation between at least one pair of diversity branches.

In an alternative arrangement the following criteria can be utilised to determine whether or not inputs from both of a pair of antennas should be used:

With a high signal-to-disturbance ratio, the inputs from both antennas of a pair should be used if the channel correlation is below a threshold TH1.

With a low signal-to-disturbance ratio, the inputs from both antennas of a pair should be used if the disturbance correlation is below a threshold TH2.

With an intermediate (medium) signal-to-disturbance ratio, the inputs from both antennas of a pair should be used if the channel correlation is below a threshold TH1' or the disturbance correlation is below a threshold TH2'.

The distinction between low/medium/high signal-to-disturbance ratio regions can include only medium signal-to-disturbance ratio regions and only low/high signal-to-disturbance ratio regions.

The inventors have observed that at high signal-to-disturbance ratios, the performance advantage provided by the use of multiple receive antennas derives from the diversity gain, which diminishes for an increased correlation between the diversity channels; whilst at low signal-to-disturbance ratios, the advantage provided by antenna diversity derives from the power gain, which is reduced by an increased correlation of the disturbance on the different diversity branches, i.e. in the presence of spatially coloured disturbance.

The invention is particularly attractive for a software implementation of the receiver, where the use of different signal processing algorithms can be supported without requiring the cost of additional hardware.

DETAILED DESCRIPTION OF THE DRAWINGS

Figure 2:
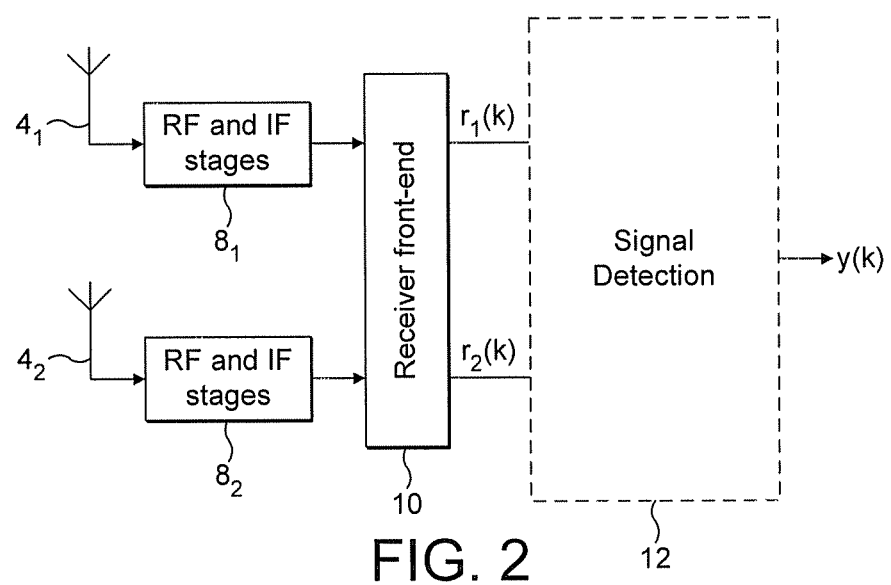
Figure 3:
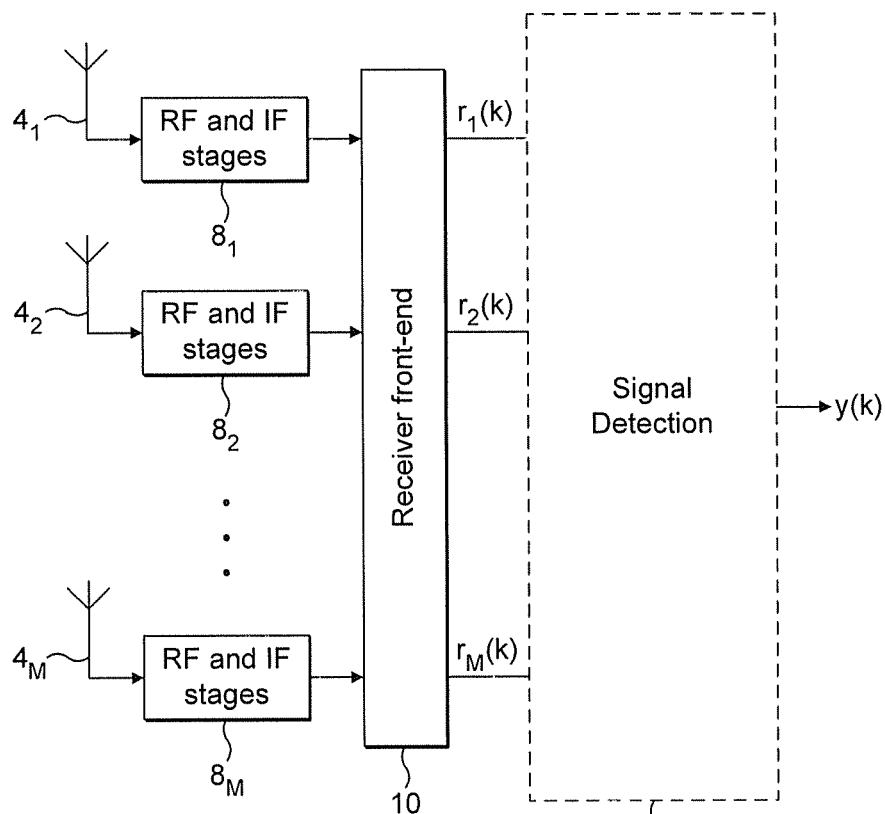
Figure 4:
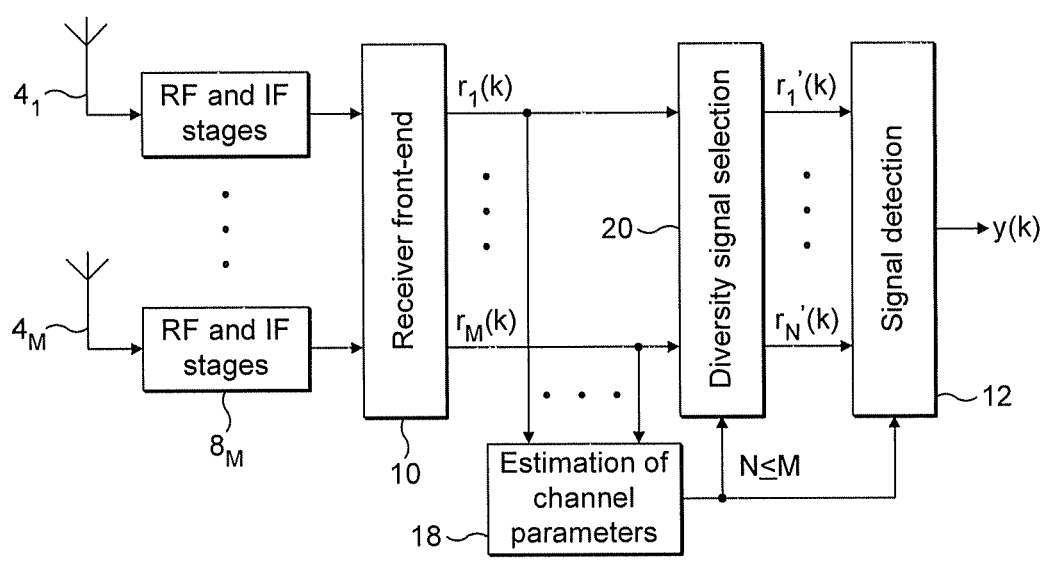
Figure 5:
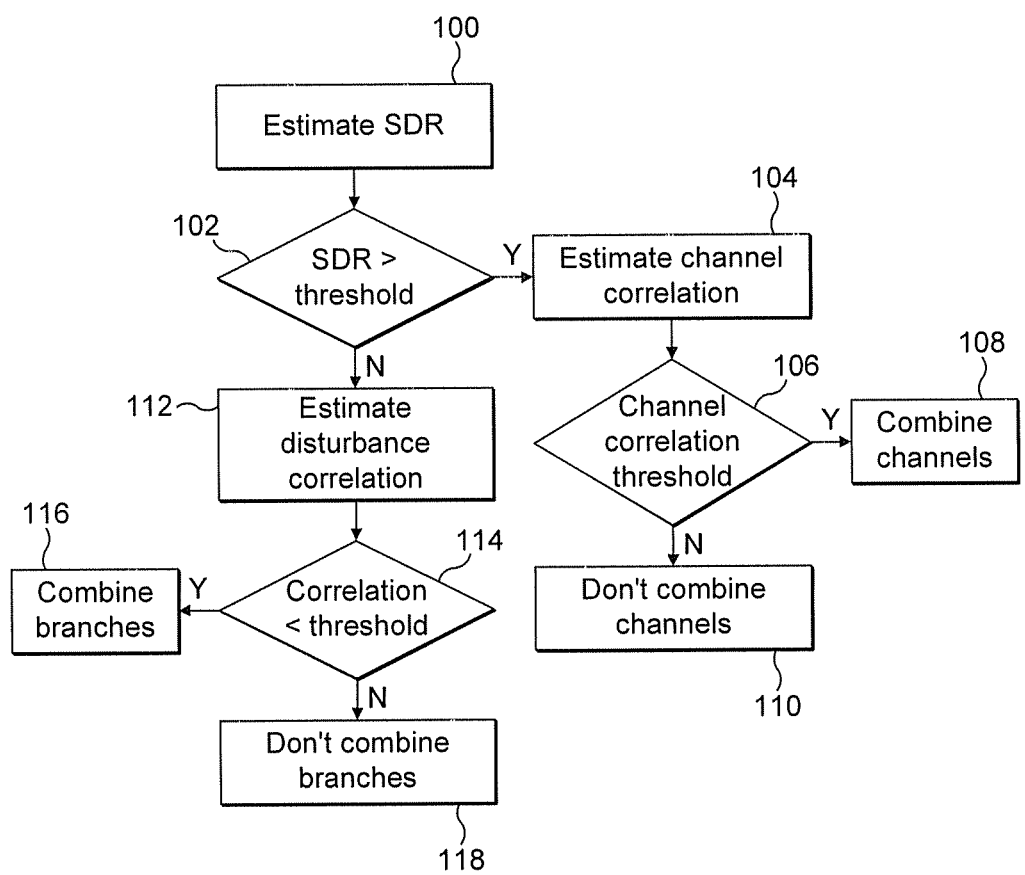

FIG. 1 is a schematic illustration of multi-path fading propagation,

FIG. 2 is a block diagram of a two-dimensional receive diversity processing for the case of two receive antennas, FIG. 3 is a block diagram of an M-dimensional receive diversity processing for the case of M receive antennas, FIG. 4 is a block diagram of a variable dimension receive diversity processing with M receive antennas, and FIG. 5 is a flow chart showing a method for selecting the dimensionality of the receive diversity processing.

DETAILED DESCRIPTION OF THE PREFERRED EMBODIMENTS

FIG. 2 is a schematic block diagram of an example wireless receiver for achieving a two-dimensional receive diversity scheme. The receiver comprises two spatially separated antennas $4_1$ and $4_2$. The antennas are typically separated by ¼ to 1 wavelength. For example, at 2 GHz the wavelength is about 5 cm, so a separation within this range is achievable within a mobile phone or such like. Below about ¼ wavelength, the effect of the diversity tends to become negligible because the channels become more correlated and experience similar disturbance (noise and/or interference).

The receiver also comprises a first block of radio frequency (RF) and intermediate frequency (IF) stages $8_1$, a second block of RF and IF stages $8_2$, and a receiver front-end 10. The first antenna $4_1$ is coupled to an input of the first RF/IF stages block $8_1$, and the second antenna $4_2$ is coupled to an input of the second RF/IF stages block $8_2$. The output of each RF/IF stages block $8_1$ and $8_2$ is coupled to an input of the receiver front-end 10.

The receiver further comprises a signal detection block 12 arranged to receive a first input $r_1(k)$ from the receiver front-end 10 corresponding to the first antenna $4_1$ and first RF/IF stages block $8_1$, and to receive a second input $r_2(k)$ from the receiver front-end 10 corresponding to the second antenna $4_2$ and second RF/IF stages block $8_2$. The route from the first antenna $4_1$ through to the signal detection block 12 defines a first receiver branch corresponding to a first propagation channel, and the route from the second antenna $4_2$ through to the signal detection block 12 defines a second receiver branch corresponding to a second propagation channel.

As discussed in further detail below, the function of the signal detection block 12 is preferably implemented in software executed on a processor programmed as a softmodem. One of the functions carried out in the signal detection block 12 can be considered as providing a reconstructed version of the transmitted signal with improved quality (e.g. reduced signal-to-disturbance ratio) with respect to each of the received diversity signals (inputs). An example is described in M. V. Clark, L. J. Greenstein, W. K. Kennedy, and M. Shafi, "Optimum Linear Diversity receivers for Mobile Communications", IEEE Transactions on Vehicular Technology, vol. 43, no. 1, pp. 47-56, February 1994

In operation, a signal is transmitted from a transmit antenna 2. The first receive antenna $4_1$ receives a first version of the signal via a first propagation channel, and the second antenna $4_2$ receives a second version of the signal via a second propagation channel. That is, the first version of the signal is the net effect of the multiple propagation paths from the transmit antenna 2 as experienced at the first receive antenna $4_1$, and the second version of the signal is the net effect of the multiple propagation paths from the transmit antenna 2 as experienced at the second receive antenna $4_2$. Each version of the signal contains the same information (that which was transmitted), but will have a amplitude, phase, distortion, including thermal noise and interference, and other channel characteristics.

The version received from the first antenna $4_1$ is passed to the input of the first RF/IF stages block $8_1$, and the version received from the second antenna $4_2$ is passed to the input of the second RF/IF stages block $8_2$. The output of each RF/IF stages $8_1$, $8_2$ is passed to the receiver front-end 10. The RF and IF stages $8_1$, $8_2$ contain circuitry for filtering, amplifying and mixing; and the front end 10 contains circuitry for correcting for DC offset, analogue to digital conversion, further filtering and buffering. For each diversity branch, there is a series of RF/IF stages, which include RF filtering stages, downconversion from RF to IF, and IF filtering stages, followed by downconversion to baseband. Such components and their operation on the received versions of the signal will be understood by a person skilled in the art, and are not discussed in further detail.

The signal detection block 12 receives a first input $r_1(k)$ from the first antenna $4_1$ via the first RF/IF stages $8_1$ and receiver front-end 10, and a second input $r_2(k)$ from the second antenna $4_2$ via the second RF/IF stages $8_2$ and receiver front-end 10. Each input $r_1(k)$ and $r_2(k)$ is shown here as being a function of the time index k. The signal detection block 12 operates on the inputs to produce a single output y(k), for use in later stages of signal processing (e.g. demodulation, deinterleaving, and channel decoding). Note herein that signal detection can encompass equalisation, techniques for which are known in the art.

The function carried out in the signal detection block 12 can implement a signal processing algorithm based for example on a Minimum Mean Squared Error (MMSE) criterion, a Least-Squares (LS) criterion, a Zero Forcing (ZF) criterion, a Maximum Ratio Combining (MRC) criterion, a Maximum-Likelihood (ML) criterion, or a Maximum A Posteriori Probability (MAP) criterion. Details of suitable receive diversity processing schemes will be known to a person skilled in the art, and again are not discussed here in further detail.

FIG. 3 is a more generalised block diagram of an example wireless receiver extended to an M-dimensional receive diversity scheme, where M may be greater than two. The number of antennas used (and therefore the number of propagation channels) is referred to as the "dimensionality" of the receiver.

Similarly to FIG. 2 but extended to M propagation channels, the receiver comprises RF and IF stages $8_1 \ldots 8_M$ coupled to each antenna $4_1 \ldots 4_M$, respectively, a receiver front end 10 coupled to each of the RF/IF stages $8_1 \ldots 8_M$, and a signal detection block 12 arranged to receive inputs $r_1(k) \ldots r_M(k)$ from the receiver front-end 10 corresponding to each antenna $4_1 \ldots 4_M$ and its associated RF/IF stages $8_1 \ldots 8_M$, respectively. Each route from an antenna $4_1 \ldots 4_M$ to the signal detection block 12 defines a respective receiver branch 1 . . . M, corresponding to a respective propagation channel 1 . . . M (at least for the case of single transmit antenna). Note that again, as in the example of FIG. 2, in practice the function of the signal detection block 12 is preferably implemented in software.

In operation, each receive antenna $4_1 \ldots 4_M$ receives a different respective version of the signal via a different respective propagation channel. Again, each version of the signal contains the same information, but will have a different power level, amplitude and phase distortion, thermal noise and interference level, and other channel characteristics. The version received from each antenna $4_1 \ldots 4_M$ is passed to the input of the respective RF/IF stages $8_1 \ldots 8_M$, and the output of each RF/IF stages $8_1 \ldots 8_M$ is passed to the receiver front-end 10. The signal detection block 12 receives inputs $r_1(k) \ldots r_M(k)$ from the antennas $4_1 \ldots 4_M$ via the respective RF/IF stages $8_1 \ldots 8_N$ and receiver front-end 10, and produces a single output y(k) for use in later stages of receiver signal processing functions.

Again, the signal detection block implements a signal processing algorithm based for example on the Minimum Mean Squared Error (MMSE) criterion, the Least-Squares (LS) criterion, the Zero Forcing (ZF) criterion, the Maximal Ratio Combining (MRC) criterion, the Maximum-Likelihood (ML) criterion, or the Maximum A Posteriori Probability (MAP) criterion.

FIG. 4 is a schematic block diagram showing an example of a receiver, such as that of FIG. 2 or 3, adapted for diversity selection according to an embodiment of the present invention. The receiver has M antennas for receiving a signal over M possible respective propagation channels, from which N are selected for actual use in producing the combined output y(k), where N is less than or equal to M. That is M-N channels are discarded and never supplied to the signal detection block.

Similarly to FIG. 2 or 3, the receiver comprises RF and IF stages $8_1 \ldots 8_M$ coupled to each antenna $4_1 \ldots 4_M$, respectively, and a receiver front end 10 coupled to each of the RF/IF stages $8_1 \ldots 8_M$. However, instead of being input straight to the signal detection block 12, each of the inputs $r_1(k) \ldots r_M(k)$ from the front-end 10 corresponding to the M respective propagation channels is input to a diversity signal selection block 20 and also to a parameter estimation block 18, both of which blocks 18 and 20 also form part of the receiver. The signal detection block 12 and diversity signal selection block 20 are arranged to receive a decision on dimensionality N from the parameter estimation block 18. The signal detection block 12 is arranged to receive N inputs $r_1'(k) \ldots r_N'(k)$ from the diversity signal selection block 20, these inputs being only a selected subset N of the M possible inputs $r_1(k) \ldots r_M(k)$ from the front-end 10. The non-related inputs are discarded.

In operation, each receive antenna $4_1 \ldots 4_M$ receives a different respective version of the signal via a different respective propagation channel. The version received from each antenna $4_1 \ldots 4_M$ is passed to the input of the respective RF/IF stages $8_1 \ldots 8_N$, and the output of each RF/IF stages $8_1 \ldots 8_M$ is passed to the receiver front-end 10. Both the parameter estimation block 18 and the diversity signal selection block 20 receive inputs $r_1(k) \ldots r_M(k)$ from the antennas $4_1 \ldots 4_M$ via the respective RF/IF stages $8_1 \ldots 8_M$ and receiver front-end 10. The parameter estimation block 18 estimates parameters of the channel and, based on those parameters, outputs a decision to the diversity signal selection block 20 as to which propagation channels to use in the diversity scheme. In response to the decision from the parameter estimation block, the diversity signal selection block 20 passes N inputs $r_1'(k) \ldots r_N'(k)$ to the signal detection block 12 from the antennas $4_1 \ldots 4_N$ via the respective RF/IF stages $8_1 \ldots 8_N$ and receiver front-end 10, these inputs being N of the M possible inputs $r_1(k) \ldots r_M(k)$. The signal detection block 12 processes only the N selected inputs $r_1'(k) \ldots r_N'(k)$ as discussed in relation to FIG. 2 or 3. The number of antennas M may be any number from two upwards, and the selected dimensionality N may be any number from one up to and including M.

Note of course that in the case where N is selected to be 1, (i.e. all other inputs are discarded) the signal detection block does not actually perform any diversity processing, but instead performs single-channel processing on the selected input r'(k) based on the chosen detection criterion, and generates the output y(k) to the subsequent receiver processing functions.

As discussed below, as with the signal detection block 12, the parameter estimation block 18 and diversity signal selection block 20 are implemented in software executed on a processor programmed as a soft-modem, in which case these "blocks" are somewhat schematic and represent functions performed by the software.

Described below is an example technique for determining the specific dimensionality N of the receiver diversity processing in the parameter estimation block 18.

For sufficient spatial separation between the receive antennas (relative to the carrier wavelength of the radio transmission), the received versions of the signal at the different antennas are characterized by uncorrelated channels (i.e., have channel impulse responses with independently fading tap-weights). If the signals received at the different antennas are characterized by uncorrelated channels, this system realizes a diversity gain, which can be exploited to improve the error performance of the receiver. The diversity gain and the corresponding performance advantage decrease for an increased correlation between the diversity channels The adaptive receiver structure discussed herein dynamically selects (on the basis of channel conditions) to perform signal detection relying on all the available receive diversity signals or on a subset of the available receive diversity signals—down to the possible use of a single received signal, in which case the receiver processing does not exploit antenna diversity. The dimensionality and cost of the receiver processing functions that perform signal detection are selected based on estimates of specific channel parameters, preferably:

estimates of the signal-to-disturbance power ratio on one or more receive diversity branches (which in a cellular system may be derived from an estimate of the cell geometry)—as described for example in our application Ser. No. UK 0721423.2 (Page White & Farrer Ref 316036 GB);

estimates of the correlation between the diversity channels; and estimates of the correlation of the disturbance on the different diversity branches.

The term 'channel' is used to denote the part of the system that models the communication from the transmitter to the receiver (which often includes parts of the transmitter and receiver chains—for instance the transmit filters and receive filters and front-end). The term 'branch' is used here to denote the receiver chain related to one of the M receive antennas.

In the following example, the estimated signal-to-disturbance ratio (SDR) is used to identify if the selection of specific dimensionality should be driven by the estimated correlation between the different diversity channels (at high SDRs) or by the estimated correlation of the disturbance on the different diversity branches (at low SDRs). The estimated SDR can be used to set different values of the threshold for the correlation between diversity channels and of the threshold for the correlation of the disturbance on diversity branches.

An example is now described in relation to FIG. 5, which is a flow chart showing a process for determining whether or not two antennas and their associated channels/branches should be used together in a receive diversity scheme. The process is based on the idea that the use of receive diversity between the two channels/branches provides a worthwhile performance advantage if:

(a) the correlation between the propagation channels is low; or
(b) the correlation between the propagation channels is high, but the SDR on each channel is low; or
the correlation between the disturbance on each branch is high, but the SDR on each channel is high;
but that otherwise the performance advantage does not outweigh the increased computational cost and power consumption that would be incurred by the diversity.

An alternative embodiment can use a medium SDR region where both correlations can be taken into account.

At step 100 the parameter estimation block 18 measures the signal-to-disturbance ration (SDR) of each of the two channels. "Disturbance" is a general term used here to refer to either noise or interference, and preferably the sum of both noise and interference. At step 102, the parameter estimation block 18 determines whether the SDR on each channel is above a certain threshold $th_{SDR}$. The actual threshold value chosen is a matter of design choice, and may be calibrated according to the particular application or circumstances in question.

If the SDR on either channel is very high, i.e. greater than $th_{SDR}$, then it is determined that the selection of dimensionality should be mainly driven by the estimated correlation between the two channels. Accordingly, at step 104 the parameter estimation block 18 estimates the correlation between the two channels. Techniques for calculating the statistical correlation between two channels are known in the art. This may be based on the tap-weights of a tapped-delay-line filter, whereby the tap-weights represent the channel impulse response h(k). Calculating the correlation may then comprise taking the covariance of the tap weights of the two channels, divided by the product of the standard deviations of the tap weights of each of the channels. This yields a result (or correlation coefficient) of 1 for perfectly correlated channels, 0 for completely independent channels, and somewhere in between for an intermediate degree of correlation.

At step 106 the parameter estimation block 18 determines whether or not the correlation between the two channels is above certain threshold $th_{ch\text{-}cor}$. The actual threshold value chosen is a matter of design choice, and may be calibrated according to the particular application or circumstances in question. If the correlation between the two propagation channels is low enough, i.e. less than $th_{ch\text{-}cor}$, then the system will benefit substantially from a diversity gain arising from the combination of those two channels. The parameter estimation block 18 thus determines at step 108 that the channels may be combined. In the case where M=2, at step 108 the parameter estimation block 18 selects both inputs $r_1(k)$ and $r_2(k)$ from the circuit branches of both receive antennas $4_1$ and $4_2$ respectively for input to the signal detection block 12.

If on the other hand the correlation between channels is too high to provide a substantial diversity gain, i.e. greater than $th_{ch\text{-}cor}$, then the channels are not combined. The parameter estimation block 18 thus determines at step 110 that the channels should not be combined. In the case where M=2, at step 110 the parameter estimation block 18 selects only one of the inputs $r_1(k)$ or $r_2(k)$ for input to the signal detection block 12 (preferably the highest SDR channel).

However, if the SDRs on both channels are determined at step 102 to be low enough, i.e. less than $th_{SDR}$, then the process proceeds to step 112 where the parameter estimation block 18 estimates the statistical correlation between the disturbance on each of the diversity branches. The correlation may be calculated as the covariance of the disturbance on the two branches divided by the product of the standard deviations of the disturbance on each branch. At step 114, the parameter estimation block 18 determines whether the disturbance correlation is below a certain threshold $th_{SDR\text{-}cor}$. Again, the actual threshold value chosen is a matter of design choice, and may be calibrated according to the particular application or circumstances in question. If the correlation between the disturbance of the two branches is low enough, i.e. less than $th_{SDR\text{-}cor}$, then the system will benefit substantially from a diversity gain arising from the combination of those two branches. The parameter estimation block 18 then determines at step 116 that the channels should be combined. In the case where M=2, at step 116 the parameter estimation block 18 selects both inputs $r_1(k)$ and $r_2(k)$ from the circuit branches of both receive antennas $4_1$ and $4_2$ respectively for input to the signal detection block 12. But if the disturbance correlation is too high, i.e. greater than $th_{SDR\text{-}cor}$, then the system will not benefit substantially from a power gain and the parameter estimation block 18 determines at step 118 that the two channels should not be combined. In the case where M=2, at step 110 the parameter estimation block 18 selects only one of the inputs $r_1(k)$ or $r_2(k)$ for input to the signal detection block 12 (preferably the highest SDR channel).

Note that where it is said "benefit substantially", it is meant that the benefit is considered to outweigh or at least compensate for the increased computational cost and power consumption incurred by the diversity scheme. This assessment is subjective to the designer and depends on the available resources.

Further, note that the above process is only by way of example. As already mentioned, a different version can make use of a medium SDR region where both correlations are taken into account.

Further, instead of a step-by-step process as in FIG. 5, the parameter estimation block 18 could estimate all of the relevant parameters such as the channel correlation, SDR and disturbance correlation before making a decision, then calculate a result q as a function of all of those parameters for use in the decision making process, e.g.:

$$q = f_1(\text{channel correlation}_{i,j}) + f_2(SDR_i, SDR_j) + f_3(\text{disturbance correlation}_{i,j})$$

Then if q is below a certain threshold $th_q$ the parameter estimation block 18 determines that the two channels i and j may be combined to provide a substantial performance advantage that outweighs the computational cost and power consumption of their combination, and if q is above $th_q$ then the parameter estimation block 18 determines that channels i and j should not be combined. The functions $f_1$, $f_2$, $f_3$ and the threshold are a matter of design choice and can be calibrated to the particular application or circumstances in question.

To extend the process to three antennas $4_1$, $4_2$ and $4_3$ and their corresponding propagation channels, a two-channel process as described above may be used to compare the first channel from the first antenna $4_1$ with the second channel from the second antenna $4_2$, and to compare the first channel with the third channel from the third antenna $4_3$, or using a multidimensional (matrix) processing approach. For example, the parameter estimation block 18 may compare the channels from antennas $4_1$ and $4_3$ and determine based on the decision making process of FIG. 5 that the channels $4_1$ and $4_3$ are suitable for combination in a receive diversity scheme. The parameter estimation block 18 may also then compare the channels from antennas $4_1$ and $4_2$ and determine based on the decision making process of FIG. 5 that the first and second channels are not suitable for combination. The parameter estimation block 18 would then control the diversity signal selection block 20 to pass only $r_1(k)$ and $r_3(k)$ to the signal detection block 12 for processing. For M>2 the correlation decisions may be based on multidimensional processing (sub-matrices of the multidimensional correlation matrix).

However, in different channel conditions, the parameter estimation block might determine that adjacent antennas are suitable to be used together for receive diversity, in which case it would control the diversity signal selection block to pass all three inputs $r_1(k)$, $r_2(k)$ and $r_3(k)$ to the signal detection block 12 for processing. Then again, in other channel conditions, the parameter estimation block 18 might determine that there is no substantial benefit in using any diversity, in which case it would select only one propagation channel (preferably the best quality channel).

Note that whether two channels can be usefully combined in diversity processing is mainly related to the physical separation of the corresponding antennas (and to the channel conditions). So if it is already determined that the first and second channels from antennas $4_1$ and $4_2$ should not be combined, then it is unlikely that the combination of the second and third channels from antennas $4_2$ and $4_3$ would produce better results than the combination of the first and third antennas from antennas $4_1$ and $4_3$ (assuming the second antenna $4_2$ is spatially situated between the first and third antennas $4_1$ and $4_3$). Therefore the parameter estimation block 18 may preferably not compare the second and third channels from antennas $4_2$ and $4_3$, although that possibility is not excluded.

In the case of four antennas in a line from $4_1$ to $4_4$, the parameter estimation block 18 may determine that the first and fourth antennas are of a sufficient separation to be used together, but that the first and second antennas are of insufficient separation to be used together. On that basis it may be assumed that the third and fourth antennas are of insufficient separation to be used together. The parameter estimation block 18 would then control the diversity signal selection block 20 to pass only two inputs $r_1(k)$ and $r_4(k)$ to the signal detection block 12 for combination. However, in different channel conditions, the parameter estimation block might determine that any two adjacent antennas are sufficiently separated to be used together for receive diversity, in which case it would control the diversity signal selection block to pass all four inputs $r_1(k)$, $r_2(k)$, $r_3(k)$ and $r_4(k)$ to the signal detection block 12 for combination. Then again, in other channel conditions, the parameter estimation block 18 might determine that there is no substantial benefit in using any diversity, in which case it would select only one propagation channel (preferably the best quality channel).

In the case of five antennas in a line from $4_1$ to $4_5$, the parameter estimation block 18 may determine that the first and fifth antennas are of a sufficient separation to be used together, that the first and third antennas are of sufficient separation to be used together, but that the first and second antennas are of insufficient separation to be used together. On that basis it may be assumed that the third and fifth antennas are sufficiently separated, and that the fourth and fifth antennas are insufficiently separated. But in different channel conditions, it could be determined that all five channels could be combined, or that only the first and fifth channels should be combined, or that only one channel should be used.

To extend the process to a general case where M>2 and 1≤N≤M, again a two channel process as discussed above may be used to compare various pairs of channels from the array of M antennas. The comparisons between channels are preferably made in order of decreasing spatial separation of the corresponding antennas, e.g. by comparing the first channel with the $M^{th}$ channel, then the first channel with the $(M/2)^{th}$ channel, then first channel with the $(M/4)^{th}$ channel, etc. All possible permutations of antenna need not necessarily be compared, although that possibility is not excluded.

As already mentioned, the functions of the parameter estimation block 18, the diversity signal selection block 20, and the signal detection block 12 are preferably implemented in software executed by a processor programmed as a software modem, or "soft-modem". The principle behind a software modem is to perform a significant portion of the signal processing required for the wireless communications in a general purpose, programmable, reconfigurable processor such as processor 34, rather than in dedicated hardware. Preferably, the software modem is a soft baseband modem. That is, on the receive side, all the radio functionality from receiving RF signals up to and including mixing down to baseband is implemented in dedicated hardware, but all functionality in the baseband domain is implemented in software executed by the processor. In addition to the described parameter estimation and diversity selection, the software modem may also handle functions such as modulation and demodulation, channel coding and decoding, channel estimation, equalisation, RAKE receiver algorithms, MIMO algorithms, voice codecs, cell measurements, and power control.

The present invention is particularly attractive for a software implementation of the receiver, where the use of different signal processing algorithms can be supported without requiring the cost of additional hardware. For a wireless cellular terminal, the proposed method has the advantage of providing a reduced computational complexity and power consumption in operating conditions where a receiver processing using a subset of the available diversity signals can achieve similar performance than the full diversity receiver. Preferred chips for implementing the present invention are sold by Icera under the trade mark Livanto®.

It will be appreciated that the above embodiments are described only by way of example. In other embodiments, the dimensionality of the receiver could also be made based on other channel parameters indicating channel conditions. Any number of antennas may be used, and the antennas need not be placed in any specific spatial arrangement. Further, the concept of the invention could apply to other forms of receive diversity such as polarisation diversity. The invention could be implemented using other platforms than the Icera 8020 soft-modem. The receiver could be mobile terminal receiving signals transmitted from a base station, a base station receiving signals transmitted by a mobile station, or be part of any other type of wireless system, cellular or not. Other applications and configurations will be apparent to the person skilled in the art. The scope of the invention is not limited by the described embodiments, but only be the following claims.

The invention claimed is:

1. A wireless receiver for receiving a signal transmitted by a transmitter, the receiver comprising:
    a plurality of antennas each for receiving a version of the signal via a different propagation channel and providing that version at a respective input;
    signal processing means configured to operate diversity processing of a supplied number of said inputs for use in performing detection of said signal;
    channel parameter estimation means configured to estimate two or more channel parameters on the propagation channels in the form of:

(i) a correlation between at least one pair of diversity channels, said correlation indicating a relative independence of said at least one pair of diversity channels, and (ii) a disturbance correlation between at least one pair of diversity branches, said disturbance correlation indicating a relative independence of disturbance on said at least one pair of diversity branches;

wherein said channel parameter estimation means is configured to estimate a signal-to-disturbance ratio of each of said channels; and selection means configured to select only a subset of said inputs to implement a specific dimensionality of the receiver diversity processing, in dependence on at least one of the correlation and disturbance correlation.

2. A receiver according to claim 1, comprising means for comparing the signal-to-disturbance ratio to a threshold.

3. A receiver according to claim 2, wherein if the signal-to-disturbance ratio is greater than a first threshold, the selection means selects the subset of inputs based on the correlation between at least one pair of diversity channels.

4. A receiver according to claim 3, wherein the selection means is configured to determine whether the correlation between the diversity channels of inputs is above a threshold, and if not to select said inputs.

5. A receiver according to claim 2, wherein if the signal-to-disturbance ratio is less than a second threshold, the selection means selects the subset of inputs based on the disturbance correlation between at least one pair of diversity branches.

6. A receiver according to claim 5, wherein the selection means is configured to determine whether the disturbance correlation is above a threshold, and if not to select said inputs.

7. A receiver according to claim 6, wherein the channel parameters in said function are a signal-to-disturbance ratio of each of said channels;

the correlation between a pair of channels; and the correlation between disturbance on a pair of diversity branches.

8. A receiver according to claim 1, wherein the selection means is configured to calculate a result as a function of said channel parameters, and to select said subset of inputs in dependence on a comparison of said result to a threshold.

9. A receiver according to claim 1, wherein the receiver comprises a processor and a memory, and said selection means, said estimation means and said combining means each comprise code sequences stored in said memory for execution by the processor.

10. A receiver according to claim 1, wherein the processor is programmed as a soft modem.

11. A method of processing a signal transmitted via a wireless network, the method comprising:

receiving at each of a plurality of antennas a version of the signal via a different propagation channel and providing that version at a respective input;

operating diversity processing of a supplied number of inputs for use in performing detection of said signal;

estimating two or more channel parameters on the propagation channels in the form of:

(i) a correlation between at least one pair of diversity channels, said correlation indicating a relative independence of said at least one pair of diversity channels; and (ii) a disturbance correlation between at least one pair of diversity branches, said disturbance correlation indicating a relative independence of disturbance on said at least one pair of diversity branches;

estimating a signal-to-disturbance ratio of each of said channels, and comparing the signal-to-disturbance estimating ratio with a threshold; and selecting only a subset of said inputs to implement a specific dimensionality of the receiver diversity processing in dependence on at least one of the correlation and disturbance correlation.

12. A method according to claim 11, comprising the step of determining the correlation between at least one pair of diversity channels and using said channel correlation to determine whether or not to supply an input for diversity processing if the signal to disturbance ratio exceeds the threshold.

13. A method according to claim 11, comprising the step of determining the disturbance correlation between disturbance on each of at least one pair of diversity branches and using said disturbance correlation to determine whether or not to select an input for diversity processing if the signal-to-disturbance ratio is less then said threshold.

14. A method according to claim 12 or 13, wherein the step of determining correlation or disturbance correlation is based on multidimensional processing.

15. A computer program product comprising:

program code means configured to operate diversity processing of a supplied number of inputs for use in performing detection of said signal received as versions at said inputs;

program code means for estimating two or more channel parameters on propagation channels over which said versions have been transmitted in the form of:

(i) a correlation between at least one pair of diversity channels, said correlation indicating a relative independence of said at least one pair of diversity channels; and (ii) a disturbance correlation between at least one pair of diversity branches, said disturbance correlation indicating a relative independence of disturbance on said at least one pair of diversity branches;

program code means for estimating a signal-to-disturbance ratio of each of said channels, and comparing the signal-to-disturbance estimating ratio with a threshold; and program code means for selecting only a subset of inputs of said inputs to implement a specific dimensionality of the receiver diversity processing, in dependence on at least one of the correlation and disturbance correlation;

wherein the program code means are stored on and executed on a non-transitory computer readable medium.

16. A method of receiving a signal in a wireless communication system comprising:

receiving different versions of the signal via a plurality of different propagation channels and producing a plurality of respective inputs;

using a supplied number of said inputs for diversity processing to perform detection of said signal;

estimating two or more channel parameters indicative of channel conditions on said propagation channels in the form of:

(i) a correlation between at least one pair of diversity channels, said correlation indicating a relative independence of said at least one pair of diversity channels; and (ii) a disturbance correlation between at least one pair of diversity branches, said disturbance correlation indicating a relative independence of disturbance on said at least one pair of diversity branches;
estimating a signal-to-disturbance ratio of each of said channels, and comparing the signal-to-disturbance estimating ratio with a threshold; and
selectively preventing one or more of said inputs from being supplied for said step of diversity processing in dependence on at least one of the correlation and disturbance correlation.

17. A mobile terminal having a wireless receiver comprising
a plurality of antennas each for receiving a version of the signal via different propagation channels and providing that version at a respective input;
signal processing means configured to operate diversity processing of a supplied number of said inputs for detection of said signal;
channel parameter estimation means configured to estimate two or more channel parameters on the propagation channels in the form of:
  (i) a correlation between at least one pair of diversity channels, said correlation indicating a relative independence of said at least one pair of diversity channels; and
  (ii) a disturbance correlation between at least one pair of diversity branches, said disturbance correlation indicating a relative independence of disturbance on said at least one pair of diversity branches;
wherein said channel parameter estimation means is configured to estimate a signal-to-disturbance ratio of each of said channels; and
selection means configured to select only a subset of said inputs to implement a specific dimensionality of the receive diversity processing, in dependence on at least one of the correlation and disturbance correlation.

18. A computer program product for detecting a signal received at a wireless receiver via a plurality of different propagation channels, the program comprising code stored on a non-transitory medium which when executed which when executed by a processor performs the steps of:
using a supplied number of inputs from said plurality of propagation channels for diversity processing to perform detection of said signal;
estimating one or more channel parameters indicative of channel conditions on said propagation channels in the form of:
  (i) a correlation between at least one pair of diversity channels, said correlation indicating a relative independence of said at least one pair of diversity channels; and
  (ii) a disturbance correlation between at least one pair of diversity branches, said disturbance correlation indicating a relative independence of disturbance on said at least one pair of diversity branches;
estimating a signal-to-disturbance ratio of each of said channels, and comparing the signal-to-disturbance estimating ratio with a threshold; and
selectively preventing one or more of said inputs from being supplied for said step of diversity processing in dependence on at least one of the correlation and disturbance correlation.

19. A wireless cellular communication system comprising:
a plurality of base stations; and
a plurality of mobile terminals;
a plurality of antennas each for receiving a version of the signal via different propagation channels and providing that version at a respective inputs;
signal processing means configured to operate diversity processing of a supplied number of said inputs for detection of said signal;
channel parameter estimation means configured to estimate two or more channel parameters on the propagation channels in the form of:
  (i) a correlation between at least one pair of diversity channels, said correlation indicating a relative independence of said at least one pair of diversity channels; and
  (ii) a disturbance correlation between at least one pair of diversity branches, said disturbance correlation indicating a relative independence of disturbance on said at least one pair of diversity branches;
wherein said channel parameter estimation means is configured to estimate a signal-to-disturbance ratio of each of said channels; and
selection means configured to select only a subset of said inputs to implement a specific dimensionality of the receive diversity processing, in dependence on at least one of the correlation and disturbance correlation.

20. A wireless receiver comprising:
a plurality of antennas each for receiving a signal via a different respective propagation channel and providing a respective input;
signal processing means configured to operate diversity processing of a supplied number of said inputs for detection of said signal;
a channel parameter estimation means configured to estimate two or more channel parameters on the propagation channels in the form of:
  (i) a correlation between at least one pair of diversity channels, said correlation indicating a relative independence of said at least one pair of diversity channels; and
  (ii) a disturbance correlation between at least one pair of diversity branches, said disturbance correlation indicating a relative independence of disturbance on said at least one pair of diversity branches;
wherein said channel parameter estimation means is configured to estimate a signal-to-disturbance ratio of each of said channels; and
selection means configured to select only a subset of said inputs to implement a specific dimensionality of the receive diversity processing by: determining whether a correlation between a pair of said channels is greater than a threshold, and if so selecting the inputs corresponding to said pair of channels for supply to the combining means, and if not to selectively prevent said inputs corresponding to said pair of channels from being supplied to the diversity processing means in dependence on at least one of the correlation and disturbance correlation.

* * * * *

UNITED STATES PATENT AND TRADEMARK OFFICE
CERTIFICATE OF CORRECTION

| | |
|---|---|
| PATENT NO. | : 9,729,224 B2 |
| APPLICATION NO. | : 12/016688 |
| DATED | : August 8, 2017 |
| INVENTOR(S) | : Carlo Luschi et al. |

Page 1 of 1

It is certified that error appears in the above-identified patent and that said Letters Patent is hereby corrected as shown below:

In the Specification

In Column 8, Line 22, after "diversity channels" please insert --.--

In the Claims

In Column 15, Lines 39 and 40, after "non-transitory medium" delete "which when executed which when executed" and please add --which when executed--

Signed and Sealed this
Twentieth Day of February, 2018

Andrei Iancu
*Director of the United States Patent and Trademark Office*